(12) United States Patent
Dixon et al.

(10) Patent No.: US 8,466,672 B2
(45) Date of Patent: Jun. 18, 2013

(54) METHOD OF PROCESSING ENCODER SIGNALS

(75) Inventors: Christopher David Dixon, Coventry (GB); Connel Brett Williams, Leamington Spa (GB); John Martin Reeve, Coventry (GB); Jiang Li, Birmingham (GB)

(73) Assignee: TRW Limited, Solihull (GB)

( * ) Notice: Subject to any disclaimer, the term of this patent is extended or adjusted under 35 U.S.C. 154(b) by 444 days.

(21) Appl. No.: 12/377,777

(22) PCT Filed: Aug. 17, 2007

(86) PCT No.: PCT/GB2007/003148
§ 371 (c)(1),
(2), (4) Date: Apr. 19, 2011

(87) PCT Pub. No.: WO2008/020231
PCT Pub. Date: Feb. 21, 2008

(65) Prior Publication Data
US 2011/0187355 A1 Aug. 4, 2011

(30) Foreign Application Priority Data
Aug. 18, 2006 (GB) .................................. 0616437.0

(51) Int. Cl.
*G01B 7/30* (2006.01)
(52) U.S. Cl.
USPC ................. 324/207.25; 324/207.23; 324/167; 360/79

(58) Field of Classification Search
USPC ................................ 324/207.25, 207.23, 167
See application file for complete search history.

(56) References Cited

U.S. PATENT DOCUMENTS

| | | | | |
|---|---|---|---|---|
| 6,246,233 | B1 * | 6/2001 | Griffen et al. | 324/207.21 |
| 6,859,002 | B2 * | 2/2005 | Desbiolles et al. | 318/400.39 |
| 7,196,527 | B2 * | 3/2007 | Stridsberg | 324/662 |

FOREIGN PATENT DOCUMENTS

| | | |
|---|---|---|
| DE | 19835091 C1 | 6/1999 |
| DE | 10061004 A1 * | 6/2002 |
| DE | 102004039739 A1 | 2/2006 |

OTHER PUBLICATIONS

International Search Report for PCT/GB2007/003148 dated Apr. 15, 2008.

\* cited by examiner

*Primary Examiner* — Huy Q Phan
*Assistant Examiner* — Adam Clarke
(74) *Attorney, Agent, or Firm* — MacMillan, Sobanski & Todd, LLC (57) ABSTRACT

A method of processing signals in a rotary encoder of the kind which comprises at least one annular track of encoding regions arranged as an alternating pattern of first encoding regions and second encoding regions. The encoder including first and second detectors, each of which is arranged to produce a first alternating output signal as the track of encoding regions rotates about its axis past the detector. The detector identifying a usable pair of transitions and a rejectable pair of transitions and utilizing the pairs of transitions to produce a compensated position measurement for the rotary encoder.

13 Claims, 5 Drawing Sheets

METHOD OF PROCESSING ENCODER SIGNALS

CROSS-REFERENCE TO RELATED APPLICATIONS

This application claims priority to International Patent Application No. PCT/GB2007/003148 filed Aug. 17, 2007, the disclosures of which are incorporated herein by reference in their entirety, and which claimed priority to Great Britain Patent Application No. 0616437.0 filed Aug. 18, 2006, the disclosures of which are incorporated herein by reference in their entirety.

BACKGROUND OF THE INVENTION

This invention relates to improvements in methods of processing encoder signals, and in particular to determining position and/or velocity from encoders, and in particular rotary encoders. It is especially suited to rotary encoders which include at least one track of magnetic encoding elements.

It is known to provide an encoder which comprises at least one track of magnetic elements arranged in an alternating sequence of north and south poles, and a detector which produces an output signal having a first state when proximal to one of the north poles and a second state when proximal to one of the south poles. Thus, as the track moves past the detector, the detector will produce a modulated output signal which alternates between the first and second states.

Commonly, the north and south poles will be of the same length (with respect to the direction of movement of the encoder track). Thus, provided the length of each pole is known it is possible to determine the velocity of the encoder track relative to the detector by measuring the time taken for the output signal to switch from one state to the other and then return to the original state.

The track may be linear to provide a linear encoder or may be annular to provide a rotary encoder. By annular we mean that the magnet elements are spaced around an annular track that is concentric with an axis of rotation of the track. Such an encoder can be used to measure the angular position of a range of rotating objects, in particular the output shaft of an electric motor.

Where the magnetic elements are equi-spaced around the annular track and are of equal circumferential length, it is possible to determine the angular velocity from the timing of transitions in the output of the detector signal. In the prior art, devices of this kind have taken measurements between every transition and produced an average so as to compensate for errors. Unfortunately, the more transitions an average is taken from, the slower the rate at which the velocity measurement is updated.

BRIEF SUMMARY OF THE INVENTION

In order to increase the resolution the magnet length can be reduced. For example, spacing 360 magnets around a track (one per 1 degree arc of track) gives ten times the resolution of 36 magnets spaced around the track. An alternative solution that has been proposed is to provide two tracks of magnetic elements, one next to the other. In the case of an angular position encoder this will comprise two annular tracks with one inside the other, both arranged about a common axis of rotation. By providing two detectors, each working from a different track, a higher resolution can be obtained than would be possible for one track.

Another alternative that has been proposed is to provide two detectors for one track. By spacing the detectors apart by one half of the length of each magnet element, two signals that are in quadrature will be produced. This gives two times the resolution of one detector.

The applicants have appreciated that in some cases the magnets on one track may interfere with the flux from the magnets on the other track, distorting the signals output from the detector. The present invention aims to provide a robust method of determining angular position which ameliorates such possible problems.

According to a first aspect the invention provides a method of processing signals in a rotary encoder of the kind which comprises at least one annular track of encoding regions arranged as an alternating pattern of first encoding regions and second encoding regions, the method comprising:

providing a first detector at a first fixed position which is arranged to produce a first alternating output signal as the track of encoding regions rotates about its axis past the detector, the alternating signal comprising a series of transitions between a first state corresponding to the detector being aligned with a first encoding region and a second state corresponding to the detector being aligned with second encoding region;

providing a second detector at a second fixed position which is arranged to produce a first alternating output signal as the track of encoding regions rotates about its axis past the detector, the alternating signal comprising a series of transitions between a first state corresponding to the detector being aligned with a first encoding region and a second state corresponding to the detector being aligned with second encoding region;

identifying a usable pair of transitions in the first and second signals comprising a transition of the first signal from the first state to the second state followed by a transition in the second signal from the first state to the second state without in the intervening period having changed from the second state to the first state; measuring the elapsed time between the transitions of the identified usable pair, and determining the angular velocity by combining the elapsed time with the spacing between the first and second detectors.

The encoding regions may comprise North and South pole magnets. Thus, the track may comprise alternating North-South magnets arranged one next to the other. In this case the first region may be a north pole and other a south, or vice versa.

By constructing a usable pair of signals in this manner, which must correspond to changes in the first and second signals attributable to a common transition between a first and a second encoding on the track, the effects of variation in the length of the encoding regions is eliminated from the velocity calculation. These changes may be due to manufacturing tolerance of the encoder or interference from magnets of adjacent tracks.

The first and second states of the first signal may differ from the first and second states of the second signal. They may be the same.

The states may comprise a logical one and a logical zero, the first state being the zero and the second the one. In this case, the usable pair identified will correspond to a rising edge. Alternatively, the first state may be one and the second zero so that the invention as claimed responds to falling edges.

Alternatively, the first and second states may be a positive value and a negative value, or indeed any two different values. It is sufficient for the purposes of this invention that the transition can be identified, and that it is possible to identify which encoding region the signal indicates is facing the detector before and after the transition. In practice, the states will be determined by the type of detector used and by any post processing circuitry used.

The method may comprise identifying all adjacent transitions of the first signal followed by the second signal, rejecting those which do not comprise usable pairs (i.e. which do not correspond to a N-N change of the first signal followed by a N-N change of the second, or a S-S change of the first followed by a S-S change of the second), and using at least one of the remaining usable pairs to determine velocity.

The method may therefore continuously monitor the changes and reject "bad" pairs of changes in the signals.

Of course, the invention could be extended to identify both rising and falling edges as usable pairs of transitions. To do so, the method may additionally include the steps of:
identifying a usable pair of transitions in the first and second signals comprising a transition of the first signal from the second state to the first state followed by a transition in the second signal from the second state to the first state without in the intervening period having changed from the first state to the second state.

In a modification, the invention may comprise identifying at least four pairs of transitions received in sequence. Where the method responds to both rising and falling edges in constructing a usable pair, a sequence of four pairs will comprise two usable pairs and two "bad" pairs. The average time between each of the two "bad" pairs will balance out, so the method may comprise adding together the times between all four pairs and dividing by the four.

The method may therefore use 2, 3 or 4 or more usable pairs to determine velocity, building an average by combining the total time between transitions of the pairs with same multiple of the spacing between the detectors. This provides some averaging which may help to compensate for noise on the signals or jitter (for digital signals).

The method may also, in addition to or as an alternative to determining velocity, determine the position of the encoder.

The method may further comprise the steps of:
identifying a sequence of four pairs of temporally adjacent transitions in the first and second signals, the four pairs including two usable pairs and two rejectable pairs;
determining the time lapse between the transitions of at least one of the rejectable pairs; and
comparing the time lapse for a usable pair with each time lapse for the rejectable pairs so as to determine an elapsed time error value for each rejectable pair.

By determining a time error value for each of the rejectable pairs, it is possible to compensate for the errors in the elapsed time for these pair, and hence compensate for errors in the measured transition points. A rejectable pair will correspond to a change in the first signal due to one magnet transition followed by a change in the second signal due to a different magnet position. This is therefore dependent on magnet length and not just detector spacing, and the error time The error time may be converted to an angular error for each rejected pair by combining the error time with the estimate of velocity. This should be an up to date estimate obtained from usable pairs.

The method may be repeated until an angular error has been obtained for every magnet to magnet edge (the edges being the parts which cause the transitions) spaced around the track. This will give a more accurate position measurement relative to the other transitions.

Whilst the angular error obtained for each magnet is sufficient to enable the relative position of the magnets to be determined, it may not give an absolute position measurement. This is because although the elapsed time between signal changes in an allowable pair will be accurate and will not vary due to magnet errors, the location of the transition that produced that pair may be unknown. For example, if it is a transition between magnets which are themselves distorted by an adjacent magnet the transition may be offset from its ideal location.

To determine the absolute position the method may further include a step of:
identifying a usable pair of transitions in the first and second signals which corresponds to a transition between pairs of magnets that occurs at a known position, and
referencing all other position measurements to this known position.

The identified usable pair that occurs at a known position may be a transition between magnets in a location at which it is known that there is no distortion of the magnetic field by other influences. Thus, this transition can be assumed to be at its "ideal" location.

Some encoders are fitted with an index pulse, a mechanical reference point—this could be used as well or in the alternative as an indication of an ideal reference point Where the encoder includes at least one additional adjacent track of magnets, the chosen transition may be one that coincides with a transition between the magnets of opposite polarity of the other track. At this point, where a north meets a south, the flux emitted by the additional track has the minimum effect on a transition in the track of encoding regions.

To ensure that a bad measurement does not corrupt the compensation the position error may be filtered using a first order filter with a time constant $K_{filt}$. The filter may be executed when a new compensation value has been calculated.

The error values which are calculated by the method may be stored in a memory in the form of a look up table. This is possible since errors caused by permanent effects, such as encoding regions tolerances or magnetic field distortions, should not vary over time. They can be recalculated periodically if required and the table updated.

Where the encoder comprises two tracks, the patterns formed by the tracks repeating periodically around the encoder, the table size can be reduced by exploiting the symmetry.

Once the errors have been determined the encoder position measurement can be compensated by adding the error to the measured position to produce a compensated position measurement.

Although in theory the adaption should be able to operate across the full speed range of the system in reality a limit will need to be placed on the compensation calculation range. This limit is required due to the requirement to see every encoder state, at each iteration of the algorithm. At higher velocities the timer quantisation could also be an issue.

For optimum performance of the method it will be appreciated that the speed of rotation of the encoder should be constant whilst the errors are being calculated. The method may therefore comprise a set of controlling the rate of rotation of the encoder whilst performing the steps of determining the errors. Alternatively, an assumption that the speed is constant is required. For example, adjacent timing values may be obtained. If the timing measurements each side are the same then the velocity can be assumed to be constant between those timing measurements In a second aspect the invention provides an encoder which is adapted to carry out the method of the first aspect of the invention.

The encoder may comprise two tracks of magnets arranged side by side. They may be annular tracks.

It should be understood that the invention provides maximum benefit for a magnetic encoder with more than one track because of potential interference between the tracks. However, it may also be used to improve the accuracy of other encoder types, such as an optical encoder. The method will compensate for tolerances in the encoder element sizing and positioning.

It should also be understood that the principles of the invention may be extended to linear as well as rotary encoders.

Other advantages of this invention will become apparent to those skilled in the art from the following detailed description of the preferred embodiments, when read in light of the accompanying drawings.

DETAILED DESCRIPTION OF THE INVENTION

Figure 1:
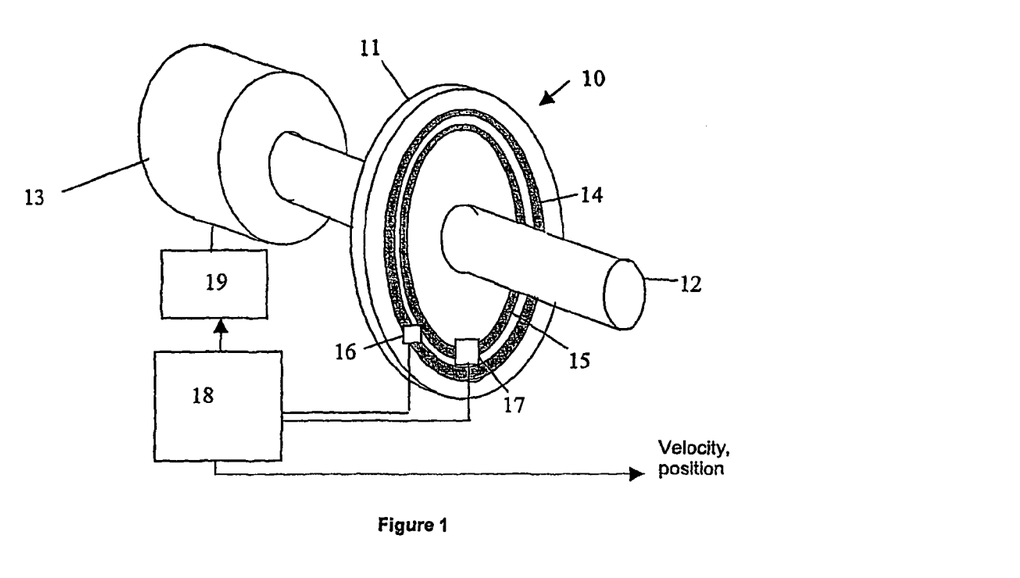
FIG. 1 is a general schematic illustrating apparatus for measuring angular position according to the method of the first aspect of the invention.

A position sensing device 10 is shown in FIG. 1. It comprises an encoder 11 attached to an output shaft 12 of a three phase electric motor 13. The device comprises an encoder disk which is secured to the shaft 12 by a set of bolts (not shown) or by welding. The disk supports two tracks 14, 15 of magnets which are arranged concentrically around the shaft axis. A first track comprises 3 pole pairs of magnets, each pair occupying an arc of 120 degrees mechanical with the second track comprising 36 pole pairs of magnets arranged in 3 sets of 24, each set of 24 occupying the same angular region as one pole pair of magnets of the first track.

Secured to a fixing bracket alongside the encoder disk is a pcb that carries two sets of detectors 16, 17. The first 17 of these is a set of Hall effect sensors. These are aligned such that they detect the passing of the magnets of the first track. The output of the Hall sensors, which will comprise a 3 bit (8 value) code is passed to a motor controller which is used to control the voltage applied to the motor phases for commutation.

The second set 16 comprises a further Hall effect sensor or other sensor that responds to changes in magnetic field (such as a Reed switch). This is aligned facing the second track so that it responds to changes in magnetic flux from the second track magnets. Next to this is another Hall effect sensor. This is the same as the first sensor of this set but because it is positioned some distance from the first sensor it will at any given time be responding to a different region of the second track.

The spacing between the first and second sensors of the second set in this embodiment is chosen to correspond to one half of the angular length of the magnets of the second track (i.e. one half of the arc subtended by a magnet of the second set). In this way, as the encoder rotates both the first and second detectors will produce a signal which varies periodically, a change occurring every time a transition between a North and a South pole of the second track magnets passes the sensor. Since they are spaced by one half of the magnet length these outputs will be in quadrature.

The output signals from the sensors are fed to a processor 18 where they are processed to determine the motor shaft position and velocity, This information can be passed to the motor controller 19 and used to control commutation of the motor 13.

Combining the outputs of the first (phase) and second (quad) sensors provides two bit (four state) signal which can be defined as the following states:

State 0—South magnet facing second (quad) detector and also first (phase) detector
State 1—South magnet facing second detector and North facing first detector;
State 2—North magnet facing second detector and south facing first detector
State 3—North magnet facing second detector and North facing first detector.

Figure 3:
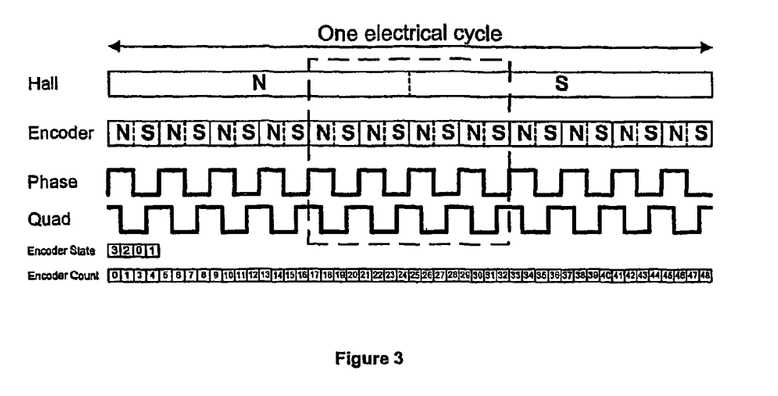
FIG. 3 is an illustration of the ideal variation in signal output from the detectors from the encoder of FIG. 1 over the electrical cycle shown in FIG. 2.

An ideal set of output signals from the second and third detectors is shown in FIG. 3 with the encoder phase and quadrature signals producing the correct electrical position and changes in the signal corresponding exactly with the edges of the magnets.

In a practical embodiment, however, there will be variations in edge position away from the ideal, equi-spaced locations. Some of these variations may be due to magnet tolerances. The applicant has also discovered that the majority of the variation is due to the hall sensor magnets of the first track interfere with the magnets of the second track.

With a north pole present on the hall sensor the north poles of the second track that are radially aligned with it are strengthened (increasing their effective width) and the south poles weakened (decreasing their effective width). Similarly a south pole strengthens and weakens south and north poles respectively. The effect on the magnetisation pattern emitted from the second track varies across the hall magnet with the centre of the hall magnet pole have a greater effect than at the edges.

Figure 4:
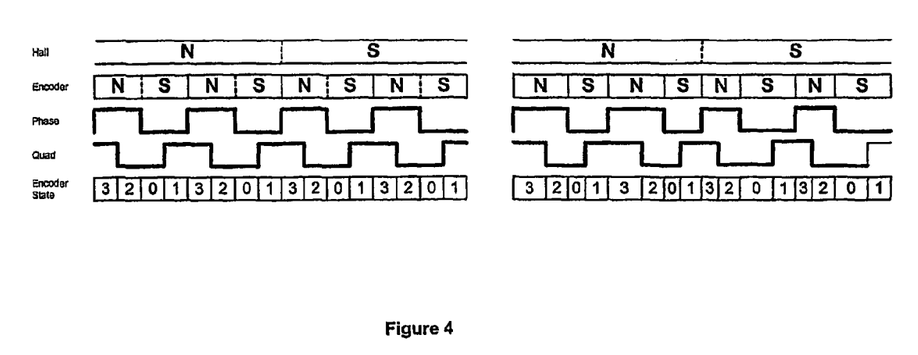
FIG. 4 is a comparison of the ideal outputs with a real output that contains errors due to interference between the encoder tracks.

The distortion to the phase and quadrature signals can be seen in FIG. 4 where the left hand diagram shows the ideal encoder. The right hand diagram show the effect that both a north and south hall encoder pole has on the encoder phase and quadrature signals.

Figure 5:
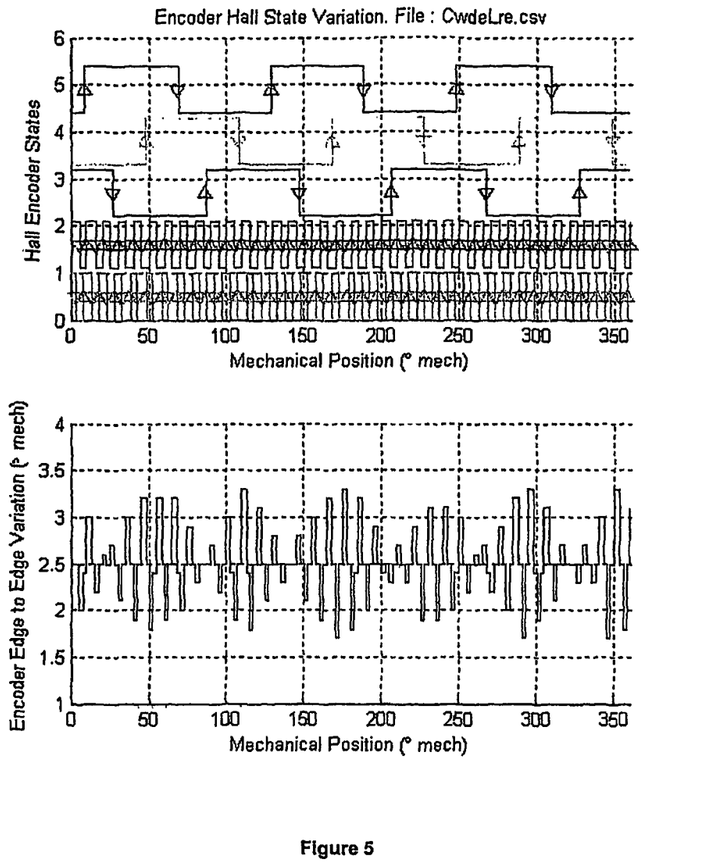
FIG. 5 illustrates the variation in encoder edge position relative to the ideal positions across a complete mechanical rotation of the encoder.
Figure 6:
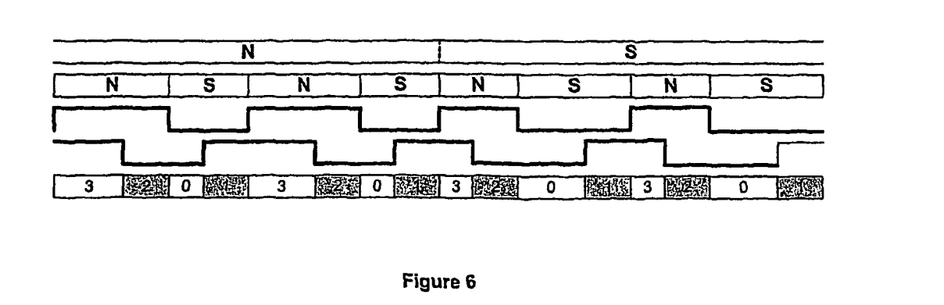
FIG. 6 illustrates the presence of constant width encoder states within output signals corresponding to the crossing of a single, common, transition between magnets and shows cyclic repetition of the error for each electrical cycle.

With distortion of the encoder edge positions the effect on the measured position of the motor may be significant. FIG. 5 illustrates the magnitude of the errors introduced in the example of FIG. 1; the upper trace shows the three hall sensor states and the encoder phase and quadrature signals over a complete mechanical revolution. The measurements were taken by referencing against a high resolution encoder. The lower trace shows the edge to edge variation, which should be a constant 2.5° mechanical for this example.

It can be seen that the deviation from the ideal encoder edge to edge difference is ±0.8° mechanical. This means that the electrical position will vary ±2.4° during one revolution. This translates into ±300 rpm noise on the velocity signal, purely due to encoder distortion.

Figure 7:
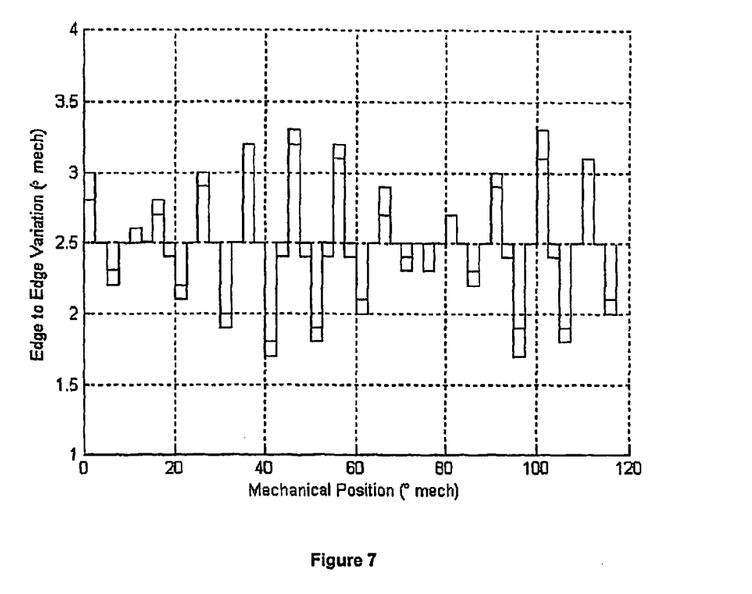
FIG. 7 is an illustration of the edge to edge position variation in the output signals over one rotation of the encoder.

As mentioned previously the effect varies in relation to the hall sensor magnets and this is evident in the periodic nature of the variation, repeating every electrical cycle. It should also be noted that for every other transition the error is extremely small, FIG. 7 shows this.

Figure 2:
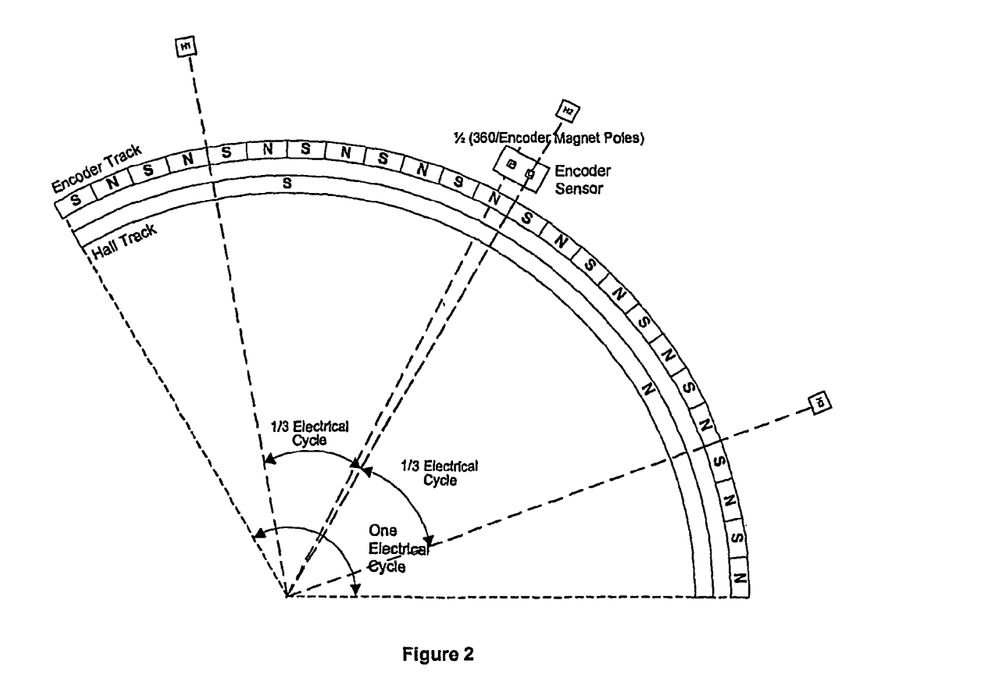
FIG. 2 is a part view of the relative location of the magnets on the encoder shown in FIG. 1 and the relative location of the detectors.

The reason for the periodic nature of the error is due to the construction of the encoder, see FIG. 2. Two magnetic tracks exist, one for the hall sensors (1, 2, 3) and one for the encoder sensors (P and Q). The encoder sensors on the PCB are positioned such that they are 2.5° mechanical apart. As both sensors see the same magnetic track the quadrature between the two signals is purely due to the sensor placement accuracy. The placement accuracy is very high and it is this fact that forms the basis of the proposed solution.

The applicant has formulated a method by which the velocity signal can be improved relatively easily by modifying the encoder timing but improvement of the position signal requires an adaptive algorithm.

Although the states of the output signals do vary in width across an electrical cycle due to the mechanical implementation the distance from a rising edge on one output signal to the rising edge on the other output signal remains constant, i.e. the angular distance for states 1 and 2 remains constant therefore it is has been appreciated that it is possible to use the timing between such edges to compute our velocity (see FIG. 3). As mentioned previously this angular distance is determined by the sensor placement accuracy within the encoder.

The velocity can be calculated in ° mech/s as:

$$\omega = \frac{\theta_{ENC}}{t_{av}}$$

where $t_{av}=\frac{1}{2}(t_1+t_2)$ or $t_{av}=\frac{1}{4}(t_1+t_2+t_3+t_4)$ but not as good
$\theta_{ENC}$ is the angular distance between encoder edges
$t_1$ and $t_2$ are the times between rising edges and falling edges respectively.

Note that it would be possible to use only one timing measurement but the additional measurement should reduce the presence of noise due to timing jitter in the calculation. For the example shown in the accompanying drawings the edge to edge distance $\theta_{ENC}$ is 2.5° mechanical.

From an implementation point of view the velocity should only be calculated when in states 0 or 3, i.e. the last edge transition information will relate the states 1 and 2.

Referring back to FIG. 5 the error is periodic and repeats every electrical cycle. This is confirmed by plotting all three electrical cycles as shown in FIG. 7. In reality the south half of the electrical cycle is the negative of the north. This could be used to reduce compensation storage even further. Again it is evident that every other transition has virtually no error (for the reasons previously explained).

To improve the position signal the applicant has appreciated that the variation present in the position can be determined and compensated for.

As previously stated the two encoder states (1 and 2) remain constant and correct despite the interfering effects of the hall sensor magnets. This information can be used to correct the errors present in the encoder position.

Figure 8:
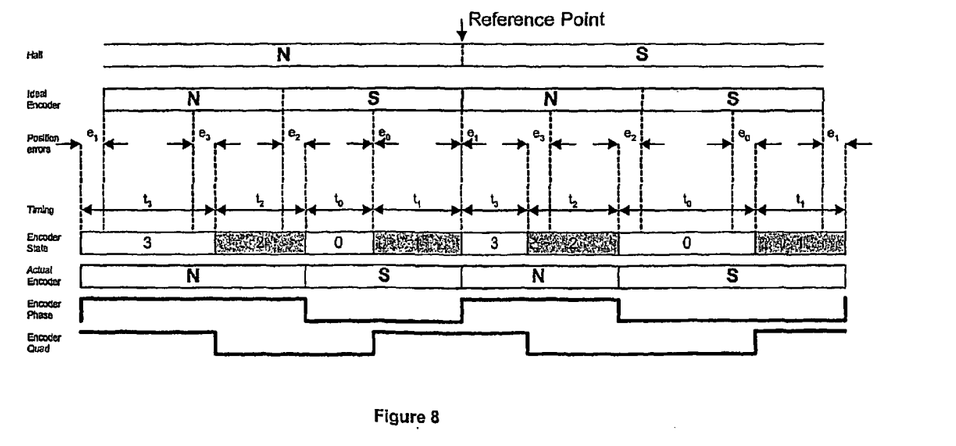
FIG. 8 is an illustration of the various errors in the edge positions.

FIG. 8 shows part of a mechanical cycle at the point where a hall sensor changes state. As a reference an ideal encoder is shown and the variation in error e marked as the north and south poles corrupt the encoder magnet.

Assuming the motor is rotating at a constant velocity then the time in encoder state 1 will be the same as the time in encoder state 2. As with the velocity calculation these two timing measurements can be averaged to minimise timing jitter and determine the time that the encoder should take between state transitions, $t_{av}$.

With the correct time for a state transition known the timing information for transitions through states 3 and 0 can be examined. Ideally these should be the same as $t_{av}$ but due to the distortion they will be different. The difference can be used to calculate the actual angular difference of each state that can in turn be used to calculate the error introduced by the distortion.

The actual encoder edge to edge difference can be calculated as:

$$\theta_0 = \frac{t_0}{t_{av}}\theta_{ENC} \text{ or } \theta_0 = \omega t_0$$

$$\theta_3 = \frac{t_3}{t_{av}}\theta_{ENC} \text{ or } \theta_3 = \omega t_3$$

As previously mentioned states 1 and 2 are determined by the placement accuracy of the encoder sensors which are fixed, therefore $\theta_1=\theta_{ENC}$ and $\theta_2=\theta_{ENC}$.

With the actual position difference known the position error, i.e. the deviation from the ideal $\theta_{ENC}$, can be calculated as:

$$e_3=\theta_{ENC}-\theta_3$$

$$e_2=e_3$$

$$e_0=\theta_{ENC}-\theta_0$$

$$e_1=e_0$$

It should be noted that although for encoder states 1 and 2 the width is constant and correct, the absolute position of the edges is incorrect. The offset is due to the errors introduced by states 0 and 3 and must be compensated for.

With all edges being shifted an absolute reference point is required. The reference point is the position at which a hall sensor changes state. It is assumed that, as the hall changes state, the distortion the hall magnet imposes on the encoder magnetisation is negligible and that the encoder transition lies in the correct position.

To ensure that a bad measurement does not corrupt the compensation the position error should be filtered using a first order filter with a time constant $K_{filt}$. The filter should only be executed when a new compensation value has been calculated.

As previously stated the positional error repeats every electrical cycle therefore the storage requirement for the compensation algorithm is to provide a compensation value for every encoder transition within the electrical cycle defined by:

$$k_{max} = \frac{1}{2} \frac{360}{p\theta_{ENC}}$$

where p is the number of pole pairs. The factor of ½ is due to the fact that correction terms $e_1$ and $e_2$ are the same as $e_0$ and $e_3$ respectively. As a result of this the storage requirements can be halved. For the illustrated embodiment the storage size is 24 for one electrical cycle.

The encoder count, k, can then be halved and used as an index into the table for compensation calculation and application.

Once the errors have been determined the encoder position measurement can be compensated by:

$$\theta'_K = \theta_K + e_K$$

The compensation value may be applied by indexing into the compensation table. Although for calculation of the compensation values the algorithm needs to see every encoder state once a compensation value has been determined the application can be directly indexed without the need to see every state (the encoder count retains the reference point)

Although in theory the adaption should be able to operate across the full speed range of the system in reality a limit will need to be placed on the compensation calculation range. This limit is required due to the requirement to see every encoder state, at each iteration of the algorithm. At higher velocities the timer quantisation could also be an issue.

To ensure that at least one algorithm occurs within each encoder state the maximum velocity (in rpm) at which compensation may be calculated is defined by:

$$\omega_{max} = \frac{1}{2}\left[\frac{60\theta_{ENC}}{360T}\right]$$

A minimum speed $\omega_{min}$ is defined by the maximum timer length for the phase and quadrature edges. Hysteresis should be applied to both $\omega_{max}$ and $\omega_{min}$.

For optimum performance of the compensation algorithm the speed of the motor should be constant, which as a constant speed is needed over such a small angle should not cause a problem. Under steady state conditions the speed will be constant and therefore $t_1 \approx t_2$. Calculation of compensation should occur if $t_1$ and $t_2$ are within a fixed percentage of one another.

Figure 9:
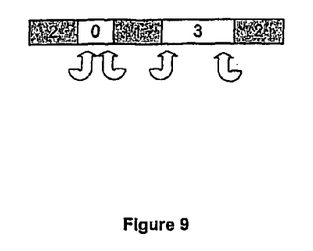
FIG. 9 shows the rate of compensation that can be applied by the method of the invention.

The encoder edges can be compensated for twice within an encoder cycle, once when in state 1 and once when in state 2, as shown in FIG. 9.

Figure 10:
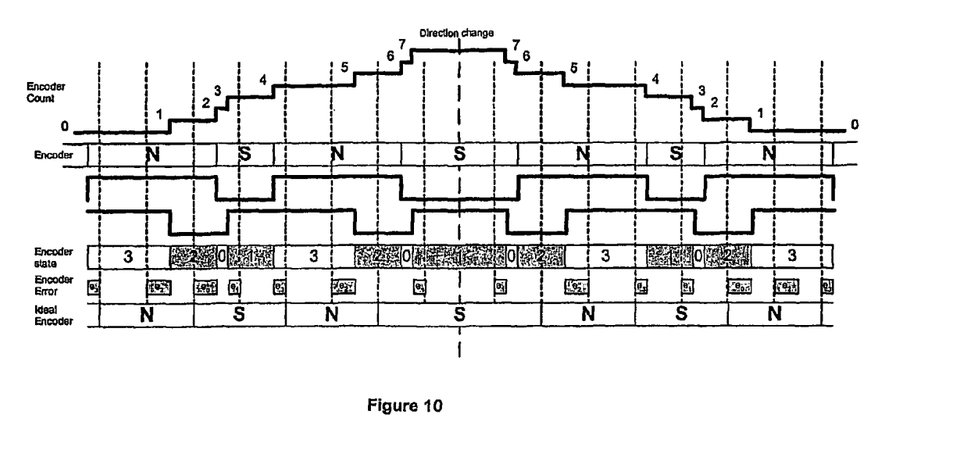
FIG. 10 illustrates the application of the method to position measurement when the encoder rotates in both directions in turn.

The edge position compensation is bidirectional and the same compensation value can be applied independent of direction. This can be seen from FIG. 10 which shows a reversal of direction and the errors with respect to ideal encoder edges.

It will therefore be understood that, at least in part, the invention lies in recognising that errors may lead to "good" usable and "bad" pairs of transitions, the good pairs being of fixed spacing set by the spacing between detectors, and the bad varying due to tolerances or other influences on the encoder elements. A method that takes this into account to construct either velocity or position measurements has been developed for which protection is sought.

Various alternatives are envisaged and the scope of the protection sought should not be limited to the specific example described. The invention can be extended to encoders which are read by more than two detectors, and which may include magnets or other encoding elements. For instance, it may be applied to measurements used to control the commutation of a motor in which a single track of elements is used, or a more complex scheme as discussed here in which a track of elements used for a Hall sensor is combined with addition track of encoder elements to enable high resolution position and velocity information to be obtained.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method of processing signals in an encoder comprising the following steps:
    (a) providing a rotary encoder that includes at least one annular track having an axis and encoding regions arranged as an alternating pattern of first encoding regions and second encoding regions, said rotary encoder also including a first detector at a first fixed position which is arranged to produce a first alternating output signal as said annular track of encoding regions rotates about its axis past said first detector, said first alternating output signal comprising a series of transitions between a first state corresponding to said first detector being aligned with a first encoding region being one of said first encoding regions and a second state corresponding to said first detector being aligned with a second encoding region being one of said second encoding regions, said rotary encoder further including a second detector at a second fixed position which is arranged to produce a second alternating output signal as said annular track of encoding regions rotates about its axis past said second detector, said second alternating signal comprising a series of transitions between a first state corresponding to said second detector being aligned with a first encoding region being one of said first encoding regions and a second state corresponding to said second detector being aligned with a second encoding region being one of said second encoding regions;
    (b) identifying a sequence of four pairs of temporally adjacent transitions in said first and second alternating output signals with each pair of transitions comprising a transition of said first alternating output signal from said first state to said second state followed by a transition in said second alternating output signal from said first state to said second state without in an intervening period having changed from said second state to said first state, said four pairs including two usable pairs and two rejectable pairs;
    (c) determining a time lapse between transitions of said usable identified pair,
    (d) determining an angular velocity by combining said elapsed time with a spacing between said first and second detectors;
    (e) determining a time lapse between transitions of at least one of said rejectable pairs;
    (f) comparing a time lapse for said usable pair with each time lapse for said rejectable pairs so as to determine an elapsed time error value for each rejectable pair; and;
    (g) utilizing said elapsed time error value to produce a compensated position measurement for said rotary encoder.

2. A method of claim 1 wherein said first and second encoding regions comprise North and South pole magnets.

3. A method of claim 2 wherein said first encoding region is a north pole and said second encoding region is a south pole.

4. A method of claim 1 which further comprises identifying all adjacent transitions of said first alternating output signal followed by said second alternating output signal, rejecting those which do not comprise said usable pairs, and using at least one of said remaining usable pairs to determine velocity.

5. A method of claim 1 which further comprises identifying said usable pair of transitions in said first and second alternating output signals comprising a transition of said first alternating output signal from said second state to said first state followed by a transition in said second alternating output signal from said second state to said first state without in an intervening period having changed from said first state to said second state.

6. A method of claim 1 which comprises the steps of identifying at least four pairs of transitions received in sequence comprising two usable pairs and two rejectable pairs, adding together times between all four pairs and dividing by four.

7. A method of claim 1 which further comprises a step of determining a position of said encoder.

8. A method of claim 7 wherein said error time is converted to an angular error for each rejected pair by combining said error time with an estimate of velocity.

9. A method of claim 1 which further includes the steps of identifying said usable pair of transitions in said first and second alternating output signals which corresponds to a transition between pairs of magnets that occurs at a known position, and referencing all other position measurements to this known position.

10. An encoder comprising:

at least one annular track having an axis and encoding regions arranged as an alternating pattern of first encoding regions and second encoding regions;

a first detector at a first fixed position which is arranged to produce a first alternating output signal as said annular track of encoding regions rotates about its axis past said first detector, said first alternating output signal comprising a series of transitions between a first state corresponding to said first detector being aligned with a first encoding region being one of said first encoding regions and a second state corresponding to said first detector being aligned with a second encoding region being one of said second encoding regions;

a second detector at a second fixed position which is arranged to produce a second alternating output signal as said annular track of encoding regions rotates about its axis past said second detector, said second alternating signal comprising a series of transitions between a first state corresponding to said second detector being aligned with a first encoding region being one of said first encoding regions and a second state corresponding to said detector being aligned with a second encoding region being one of said second encoding regions; and a processor configured to:

identify a sequence of four pairs of temporally adjacent transitions in said first and second alternating output signals with each pair or transitions comprising a transition of said first alternating output signal from said first state to said second state followed by a transition in said second alternating output signal from said first state to said second state without in an intervening period having changed from said second state to said first state, said four pairs including two usable pairs and two rejectable pairs;

determine a time between transitions of said identified usable pair;

determine an angular velocity by combining said elapsed time with a spacing between said first and second detectors;

determine a time lapse between transitions of at least one of said rejectable pairs;

compare a time lapse for said usable pair with each time lapse for said rejectable pairs so as to determine an elapsed time error value for each rejectable pair; and utilize said elapsed time error value to produce a compensated position measurement for said rotary encoder.

11. An encoder according to claim 10 which comprises two tracks of magnets arranged side by side.

12. An encoder according to claim 11 which comprises two tracks of magnets, each magnet defining an encoding region, a magnetic field from one or more magnets in one track interfering with a field of one or more magnets of a second track to introduce an elapsed time measurement error in a measured time between transitions from a first state to a second state of an alternating output signal.

13. An encoder according to claim 10 wherein the encoder regions comprise magnets.

* * * * *